Nov. 8, 1927.
T. J. FAY
VEHICLE SUSPENSION DEVICE
Filed April 30, 1927
1,648,170
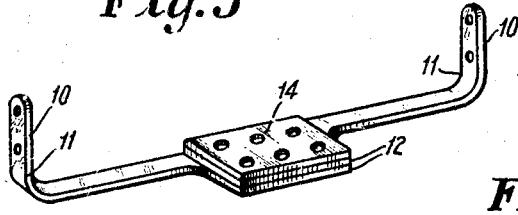
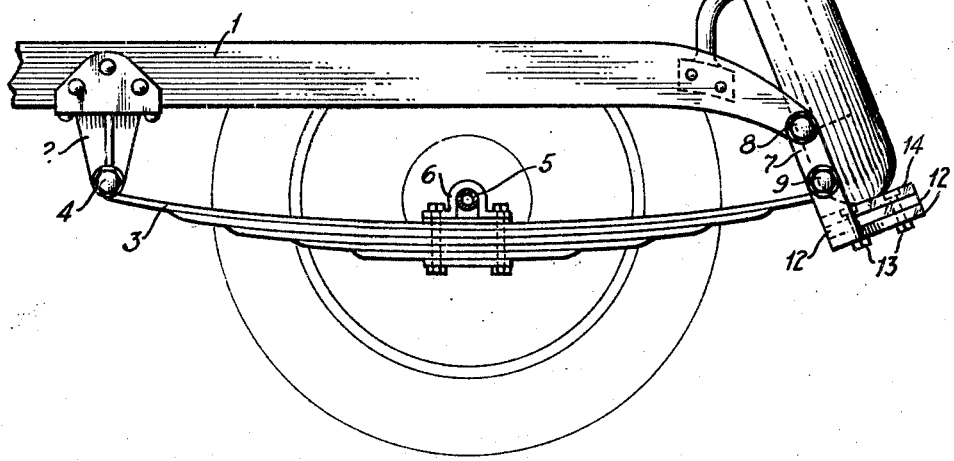
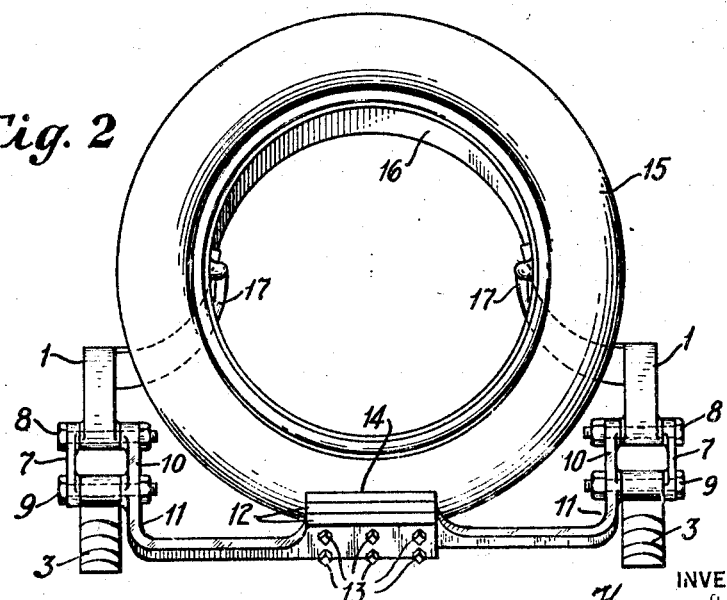
INVENTOR
Thomas J. Fay
BY
ATTORNEY Patented Nov. 8, 1927.

1,648,170

UNITED STATES PATENT OFFICE.

THOMAS J. FAY, OF BROOKLYN, NEW YORK.

VEHICLE SUSPENSION DEVICE.

Application filed April 30, 1927. Serial No. 187,840.

This invention relates to vehicles and to the control of the relative movements between the chassis frame and axle, and particularly to such devices as are disclosed in my copending applications Serial #73,397 filed December 5th, 1925, patented June 7, 1927, Patent No. 1,631,803, and Serial #181,107 filed April 5th, 1927, and is an improvement upon the structures shown and described therein.

The principal disadvantages of prior devices for controlling movements of a vehicle are that when they are effective in their control they so restrict the movements of a vehicle that the riding qualities thereof are not materially bettered. They fall short of obtaining the most desirable results owing to the fact that they restrict the permissible and desirable relative motion between the chassis frame and axle as well as the undesirable movement and particularly snub the desirable as well as control the undesirable motion.

In my prior applications I have shown and described various means for obtaining the desired qualities of ease in riding, but such devices as there described must generally be constructed for each individual vehicle to which they are to be applied. It is the purpose of this invention to provide such a device which will produce the desired riding qualities in a vehicle, which may be of substantially standard construction and which may be readily packed and shipped for commercial transportation.

It is an object of this invention to provide such a device which will suspend the vehicle in a manner that the suspension is sufficiently sensitive to absorb minor shocks and yet prevent excessive bouncing and other sudden relative movements of the chassis frame and axle when travelling over relatively rough roadways. It is also an object of this invention to provide such a device which is readily attachable to vehicles without material change to their structure in a simple and rapid manner and which may be conveniently and readily shipped to points of distribution and application.

In accordance with the invention I utilize the usual pneumatic tire carried as a spare tire at the rear of the car and interpose a connection between it and the usual shackle links of the rear springs in such a manner that movement of these links will be resisted by the tire. For simplicity and convenience in shipping and installing I secure the two shackles together by means of a pair of removable members which may be secured to the shackles and to each other and which carry an abutment surface for contacting with the spare tire.

Various other features and advantages will be apparent from the following description of an embodiment of this invention and the novel features will be particularly pointed out hereinafter in connection with the appended claims.

In the accompanying drawings:

Fig. 1 is a side sectional elevation of a vehicle constructed in accordance with this invention and illustrating one embodiment thereof;

Fig. 2 is a rear elevation of the same, and

Fig. 3 is a perspective of the attachment involved in this invention and removed from the vehicle.

In my copending applications above referred to I have described devices somewhat similar to this invention, one of which necessitates a slight change in the spring and shackle devices such as are usually employed in automotive construction and in the other thereof I have shown a device which may be attached directly to the spring suspension elements of a vehicle. In the embodiment herein shown and described, the invention may be applied by merely changing one of the removable links of each pair of shackle connections.

Referring particularly to the drawings, the chassis frame 1 is provided with a depending bracket 2 on each side, to which spring elements 3 are pivotally attached on each side of the vehicle, by means of a pin 4 which projects through the bracket 2 and the end of the spring members. Each spring element 3 is also connected at a point intermediate of its length to the axle housing 5 in the usual manner, such as clamping devices 6.

The usual rear shackles connect the rear ends of the springs 3 to the ends of the side chassis members 1. These shackle members comprise an outer link 7 which is bored at its extremities to receive two shackle pins 8 and 9, one of which extends through the usual opening through the end of the frame member and the other of which extends through a bushed end of the springs 3, the link forming a swinging connection therebetween. Instead of the usual inner links which would ordinarily correspond to links 7 and connect the inner ends of the pins 8 and 9, special inner links 10 are provided upon each side which have downwardly projecting arms 11, which arms are bent inwardly at right angles toward the center of the vehicle and terminate in end portions 12 at a point slightly beyond the center of the vehicle. The arms 11 are of such length that the ends 12 thereof overlap when the inner links 10 are attached and held in position by the shackle bolts 8 and 9. The ends may be conveniently secured together by means of bolts 13 and a top wear-plate or abutment plate 14 may be provided into which the heads of bolts 13 may be countersunk to provide a smooth abutment surface and to provide greater strength and rigidity. It is to be noted that the wear-plate 14 and the end portions 12 of the arms 11 are of greater width than the remaining portions of the links 10, although it is obvious that if so desired the links 10 and arms 11 may be of the same width and only the wear-plate 14 constituting the abutment surface may be of greater width.

The usual spare tire 15 is detachably mounted upon a ring 16 supported by two arms 17 carried by the frame 1. The links 10 are proportioned and have arms 11 bent in such a manner that the end portions 12 and the plate 14 abut the lower portion of the periphery of the spare tire. It has been found desirable to incline the abutment plate 14 which contacts with the tire 15, so that there will be a wedging motion between the abutment plate 14 and the tire 15 whenever there is a relative motion between the spring elements 3 and the chassis frame, which motion will obviously produce a rotative motion of the shackle connections and the wear-plate 14 about the upper shackle bolts 8, as pivots. It has been found that this wedge-like action is particularly effective in controlling and smoothing out movements of the vehicle, caused by irregularities of the roadway, without sudden and violent shocks and jars to the occupants of the vehicle.

It will be obvious that various changes in the details which have been herein described and illustrated for the purpose of explaining the nature of this invention may be made by those skilled in the art within the principle and scope of this invention as expressed in the appended claims.

I claim:

1. In a vehicle, a chassis frame, an axle, suspension elements on each side of the vehicle connected at one end to the frame, at an intermediate point to the axle, and at its other end by a shackle device to the frame, a pneumatic tire carried by the frame between said elements, a pair of detachable members connecting said shackle devices at each side of the frame, and having an abutment surface thereon disposed adjacent to the tire whereby upon movement of the chassis frame relatively to the suspension elements, said abutment surface will contact with said tire, and means for securing said members together.

2. In a vehicle, a chassis frame, an axle, suspension elements on each side of the vehicle connected at one end to the frame at a point intermediate of its length to the axle, and at one end to the chassis frame, by a shackle device disposed between the suspension element and the chassis frame, each device including a link having an arm extending therefrom toward the center of the chassis frame, said links being secured together at their ends and having an abutment surface thereon, and a resilient device carried by the chassis frame and engaging with said abutment surface whereby relative movements of the frame and axle will be resisted by said resilient device.

3. In a vehicle, a chassis frame, an axle, a suspension element at each side of the vehicle, connected at one end to the frame at an intermediate point to the axle and at its other end by a swinging shackle device to the frame, a pneumatic tire carried by the frame between said suspension elements, a link connected at each of said shackle devices and adapted to swing therewith and having arms extending therefrom toward the center of the vehicle and disposed adjacent to said tire for movement into contact therewith upon relative movements of said frame and said axle, and means for securing said arms rigidly together.

4. In a vehicle, a chassis frame, an axle, a suspension element at each side of the vehicle, connected at one end to the frame at an intermediate point to the axle and at its other end by a swinging shackle device to the frame, a pneumatic tire carried by the frame between said suspension elements, a link connected to each of said shackle devices and adapted to swing therewith and having arms extending therefrom toward the center of the vehicle having an abutment plate attached thereto and disposed adjacent to said tire for movement into contact therewith upon relative movements of said frame and said axle and means for securing said arms rigidly together.

In witness whereof, I hereunto subscribe my signature.

THOMAS J. FAY.